Feb. 9, 1954
L. P. CHANEY
2,668,948
CONNECTING MEANS FOR ELECTRICAL CONDUCTORS
Filed April 27, 1953
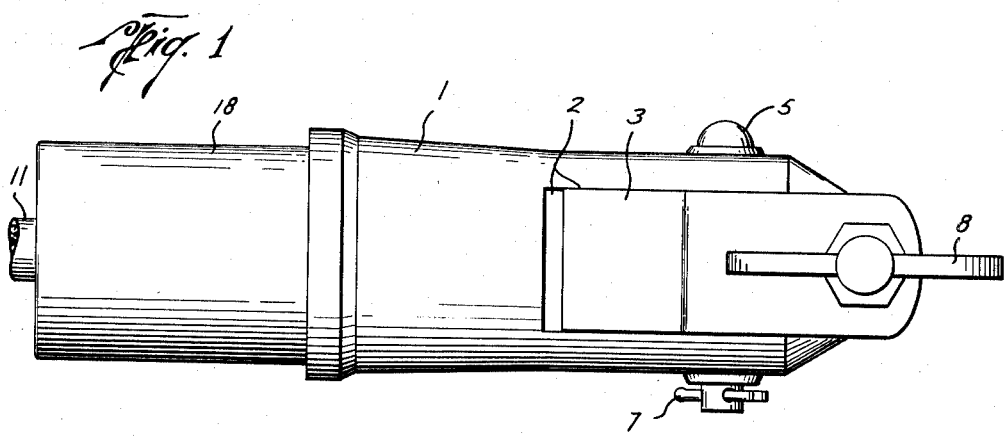
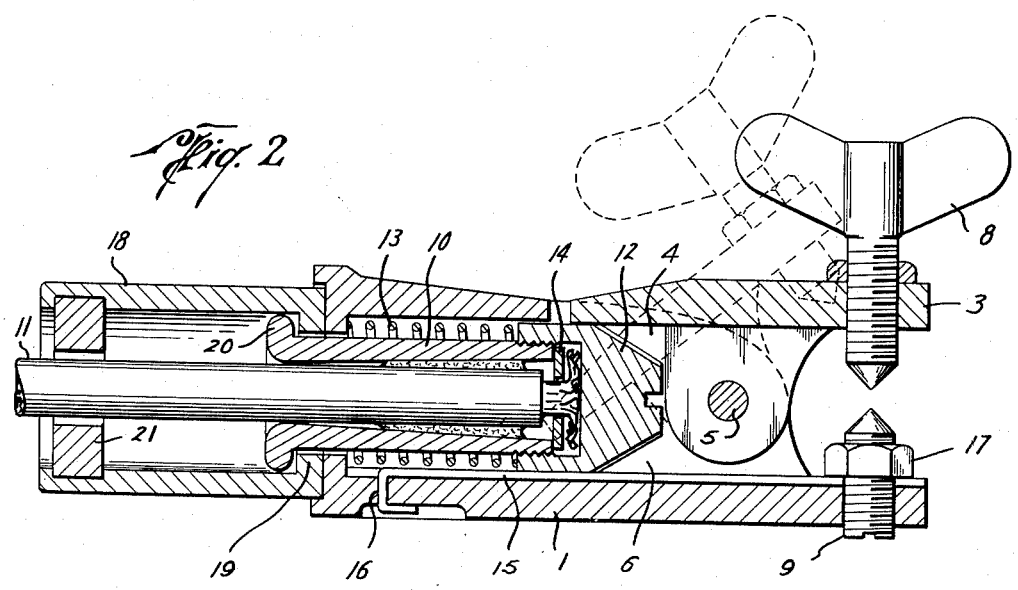
Leonard P. Chaney
INVENTOR.
BY
ATTORNEY Patented Feb. 9, 1954

2,668,948

UNITED STATES PATENT OFFICE 2,668,948

CONNECTING MEANS FOR ELECTRICAL CONDUCTORS

Leonard P. Chaney, Houston, Tex.

Application April 27, 1953, Serial No. 351,250

10 Claims. (Cl. 339—74)

The invention concerns connecting means for an electrical conductor such as a wire cable. It concerns more particularly a quickly releasable clamp for use in detachably connecting one end of a cable.

It is an object of the invention to provide connecting means of the type described which is particularly adapted for use in grounding tank cars and other types of vehicles, vessels and airships while inflammable or explosive material is being loaded or unloaded for transport or for fuel.

In loading and unloading tank cars, for example, it is customary to ground them as a protection against static electricity. It often happens that, when the car is ready to be moved away from the loading rack, the operators neglect to detach the electrical conductor from the car and the connecting clamp, together with all or part of the conductor, is carried off with the car. The expense of replacing such clamps and conductors, when multiplied many times, becomes considerable.

The invention contemplates a quickly releasable clamp which may be readily detached by simply pulling it with respect to the cable.

The invention will be readily understood by referring to the following description and the accompanying drawing, in which:

Fig. 1 is a side view of connecting means embodying the invention.

Fig. 2 is a sectional view, taken at right angles to the view shown in Fig. 1.

Referring to the drawing, the connecting means of the invention includes a tubular body 1, which has a longitudinal slot 2 formed in the wall thereof adjacent one end. A jaw 3 is disposed within the slot 2, and in its closed position lies flush with the wall of the body 1. A web portion 4, which is formed on the under side of the jaw 3, is disposed within the body 1 and is pivotally connected, by a pin 5, to a corresponding web portion 6 which extends inwardly from the opposite wall of the body 1. The pin 5 extends thru opposite sides of the body 1, and is secured by a cotter pin 7.

A thumb screw 8, which has a hardened point, extends inwardly from the outer end of the jaw 3, and a set screw 9, which likewise has a hardened point, extends inwardly from the opposite wall of the body 1. The arrangement is such that, when the jaw 3 is in its closed position, the device may be connected to any desired object by adjusting the thumb screw 8 with respect to the set screw 9 whereby the object is clamped between them.

A sleeve 10, which is connected to one end of a wire cable 11, is disposed within the end of the body 1 opposite the jaw 3. The sleeve 10 has a tapered bore, and the end of the cable 11, which is disposed within the bore of the sleeve 10, is wrapped with tape so that when the cable 11 is pulled with respect to the sleeve 10 the end of the cable 11 becomes wedged in the sleeve 10, forming a tight joint.

The inner end of the sleeve 10 is connected by threads to a cam member 12 which has a cylindrical end portion surrounding the end of the sleeve 10 and a conical end portion which extends inwardly therefrom. The sleeve 10 and the cam member 12 are movable longitudinally within the body 1, and the cam member 12 engages the under side of the jaw 3, whereby the jaw 3 is normally maintained in its closed position, when the sleeve 10 and the cam member 12 are advanced to their innermost positions. A compression spring 13, which surrounds the sleeve 10, urges the sleeve 10 and the cam member 12 inwardly. One end of the spring 13 bears against the cam mmeber 12, while its opposite end bears against an internal shoulder which is formed on the extreme outer end of the body 1.

The extreme ends of the strands of wire comprising the cable 11 are spread outwardly and clamped between the inner surface of the cam member 12 and a ring 14, which is disposed immediately adjacent the inner end of the sleeve 10, to form a tight electrical connection between the cable 11 and the cam member 12.

The peripheral surface of the cam member 12 slidably engages a ribbon-like conducting element 15, which is disposed within a longitudinal groove formed in the inner surface of the body 1. One end of the conducting element 15 is anchored in a slot 16 formed in the wall of the body 1, while its opposite end is clamped between the body 1 and a nut 17, which engages the inner end of the set screw 9.

A tubular member 18 surrounds the portion of the cable 11 immediately adjacent the outer end of the sleeve 10, and is anchored to the sleeve 10 by an internal shoulder 19, formed on the inner end of the tubular member 18, which engages an external shoulder 20 formed on the adjacent end of the sleeve 10. The shoulder 19 is loosely clamped between the shoulder 20 and the adjacent end of the body 1 when the device is in its operative position. A resilient annular member 21, which is disposed within the tubular member 18 adjacent its outer end, surrounds the cable 11 and protects it against damage from excessive bending.

In operation, the jaw 3 normally is maintained in its closed position by the action of the cam member 12, which is maintained in its operative position by the spring 13. With the jaw 3 in its closed position, the thumb screw 8 may be adjusted with respect to the set screw 9 to securely attach the device to an object. Upon pulling the device with respect to the cable 11, the cam member 12 is disengaged from the jaw 3, which then opens freely, thus disengaging the device from the object to which it is attached.

The tubular member 18 is primarily a lever designed to retract the cam member 12 when the cable 11 is pulled in any direction which is not parallel to the axis of the clamp.

The invention may be modified in various ways without departing from the spirit and scope thereof.

I claim:

1. In combination with an electrical conductor, connecting means comprising a tubular body having a longitudinal slot formed in the wall thereof adjacent one end, a jaw disposed within the slot and pivotally connected to the body, a sleeve connected to one end of the conductor and disposed within the end of the body opposite the jaw, and a cam member connected to the inner end of the sleeve, the sleeve and the cam member being movable longitudinally within the body and the cam member engaging the jaw whereby it is normally maintained in its closed position when the sleeve and the cam member are advanced to their innermost positions.

2. In combination with an electrical conductor, connecting means comprising a tubular body having a longitudinal slot formed in the wall thereof adjacent one end, a jaw disposed within the slot and pivotally connected to the body, a sleeve connected to one end of the conductor and disposed within the end of the body opposite the jaw, a cam member connected to the inner end of the sleeve, the sleeve and the cam member being movable longitudinally within the body and the cam member engaging the jaw whereby it is normally maintained in its closed position when the sleeve and the cam member are advanced to their innermost positions, and a compression spring acting upon the sleeve and the cam member to urge them inwardly.

3. In combination with an electrical conductor, connecting means comprising a tubular body having a longitudinal slot formed in the wall thereof adjacent one end, a jaw disposed within the slot and pivotally connected to the body, a thumb screw extending inwardly from the outer end of the jaw, a set screw extending inwardly from the opposite wall of the body, a sleeve connected to one end of the conductor and disposed within the end of the body opposite the jaw, a cam member connected to the inner end of the sleeve, the sleeve and the cam member being movable longitudinally within the body and the cam member engaging the jaw whereby it is normally maintained in its closed position when the sleeve and the cam member are advanced to their innermost positions, and a compression spring acting upon the sleeve and the cam member to urge them inwardly.

4. In combination with an electrical conductor, connecting means comprising a tubular body having a longitudinal slot formed in the wall thereof adjacent one end, a jaw disposed within the slot and lying flush with the wall of the body when in its closed position, the jaw having a web portion formed on the under side thereof and disposed within the body, the web portion of the jaw being pivotally connected to a corresponding web portion extending inwardly from the opposite wall of the body, a sleeve connected to one end of the conductor and disposed within the end of the body opposite the jaw, a cam member connected to the inner end of the sleeve, the sleeve and the cam member being movable longitudinally within the body and the cam member engaging the jaw whereby it is normally maintained in its closed position when the sleeve and the cam member are advanced to their innermost positions, and a compression spring acting upon the sleeve and the cam member to urge them inwardly.

5. In combination with an electrical conductor, connecting means comprising a tubular body having a longitudinal slot formed in the wall thereof adjacent one end, a jaw disposed within the slot and lying flush with the wall of the body when in its closed position, the jaw having a web portion formed on the under side thereof and disposed within the body, the web portion of the jaw being pivotally connected to a corresponding web portion extending inwardly from the opposite wall of the body, a sleeve connected to one end of the conductor and disposed within the end of the body opposite the jaw, the sleeve having a tapered bore and one end of the conductor being received within the tapered bore, the end of the conductor being wrapped with tape and pulled tight in the bore, a cam member connected to the inner end of the sleeve, the sleeve and the cam member being movable longitudinally within the body and the cam member engaging the jaw whereby it is normally maintained in its closed position when the sleeve and the cam member are advanced to their innermost positions, and a compression spring acting upon the sleeve and the cam member to urge them inwardly.

6. In combination with an electrical conductor, connecting means comprising a tubular body having a longitudinal slot formed in the wall thereof adjacent one end, a jaw disposed within the slot and lying flush with the wall of the body when in its closed position, the jaw having a web portion formed on the under side thereof and disposed within the body, the web portion of the jaw being pivotally connected to a corresponding web portion extending inwardly from the opposite wall of the body, a sleeve connected to one end of the conductor and disposed within the end of the body opposite the jaw, a cam member connected to the inner end of the sleeve, the cam member having a conical end portion, the sleeve and the cam member being movable longitudinally within the body and the cam member engaging the under side of the jaw whereby the jaw is normally maintained in its closed position when the sleeve and the cam member are advanced to their innermost positions, and a compression spring acting upon the sleeve and the cam member to urge them inwardly.

7. In combination with an electrical conductor, connecting means comprising a tubular body having a longitudinal slot formed in the wall thereof adjacent one end, a jaw disposed within the slot and lying flush with the wall of the body when in its closed position, the jaw having a web portion formed on the under side thereof and disposed within the body, the web portion of the jaw being pivotally connected to a corresponding web portion extending inwardly from the opposite wall of the body, a thumb screw extending inwardly from the outer end of the jaw, a set screw extending inwardly from the opposite wall of the body, the arrangement being such that, when the jaw is in its closed position, the device may be connected to an object by adjusting the thumb screw with respect to the set screw whereby the object is clamped between them, a sleeve connected to one end of the conductor and disposed within the end of the body opposite the jaw, the sleeve having a tapered bore and one end of the conductor being received within the tapered bore, the end of the conductor being wrapped with tape and pulled tight in the bore, a cam member connected to the inner end of the sleeve, the cam member having a cylindrical end portion surrounding the end of the sleeve and a conical end portion which extends inwardly therefrom, the sleeve and the cam member being movable longitudinally within the body and the cam member engaging the under side of the jaw whereby the jaw is normally maintained in its closed position when the sleeve and the cam member are advanced to their innermost positions, and a compression spring surrounding the sleeve and acting upon the sleeve and the cam member to urge them inwardly, one end of the spring bearing against the cam member and its opposite end bearing against an internal shoulder formed on the extreme outer end of the body.

8. Apparatus as described in claim 7 in which the electrical conductor is a wire cable and the extreme ends of the strands of wire comprising the cable are spread outwardly and clamped between the inner surface of the cam member and a ring disposed immediately adjacent the inner end of the sleeve to form a tight electrical connection between the cable and the cam member.

9. Apparatus as described in claim 7 in which the peripheral surface of the cam member slidably engages a ribbon-like conducting element disposed within a longitudinal groove formed in the inner surface of the body, one end of the conducting element being anchored in a slot formed in the wall of the body and its opposite end being clamped between the body and a nut which engages the inner end of the set screw.

10. In apparatus as described in claim 7, a tubular member surrounding the portion of the conductor immediately adjacent the outer end of the sleeve, the tubular member being anchored to the sleeve by an internal shoulder formed on the inner end of the tubular member and engaging an external shoulder formed on the adjacent end of the sleeve, the shoulder of the tubular member being loosely clamped between the shoulder of the sleeve and the adjacent end of the body when the device is in its operative position, and a resilient annular member disposed within the tubular member adjacent its outer end, the annular member surrounding the conductor.

LEONARD P. CHANEY.

No references cited.